Sept. 12, 1967     S. W. GLOVER     3,340,964
DESCENT CONTROL MECHANISM
Filed Nov. 3, 1965     2 Sheets-Sheet 1
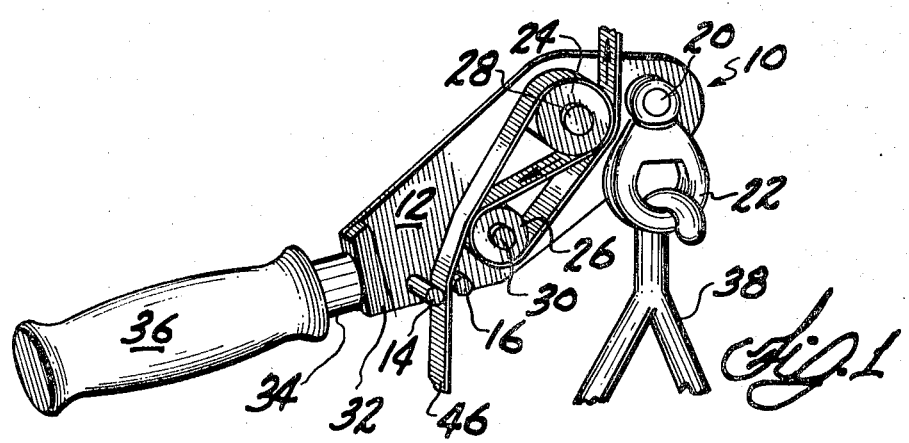
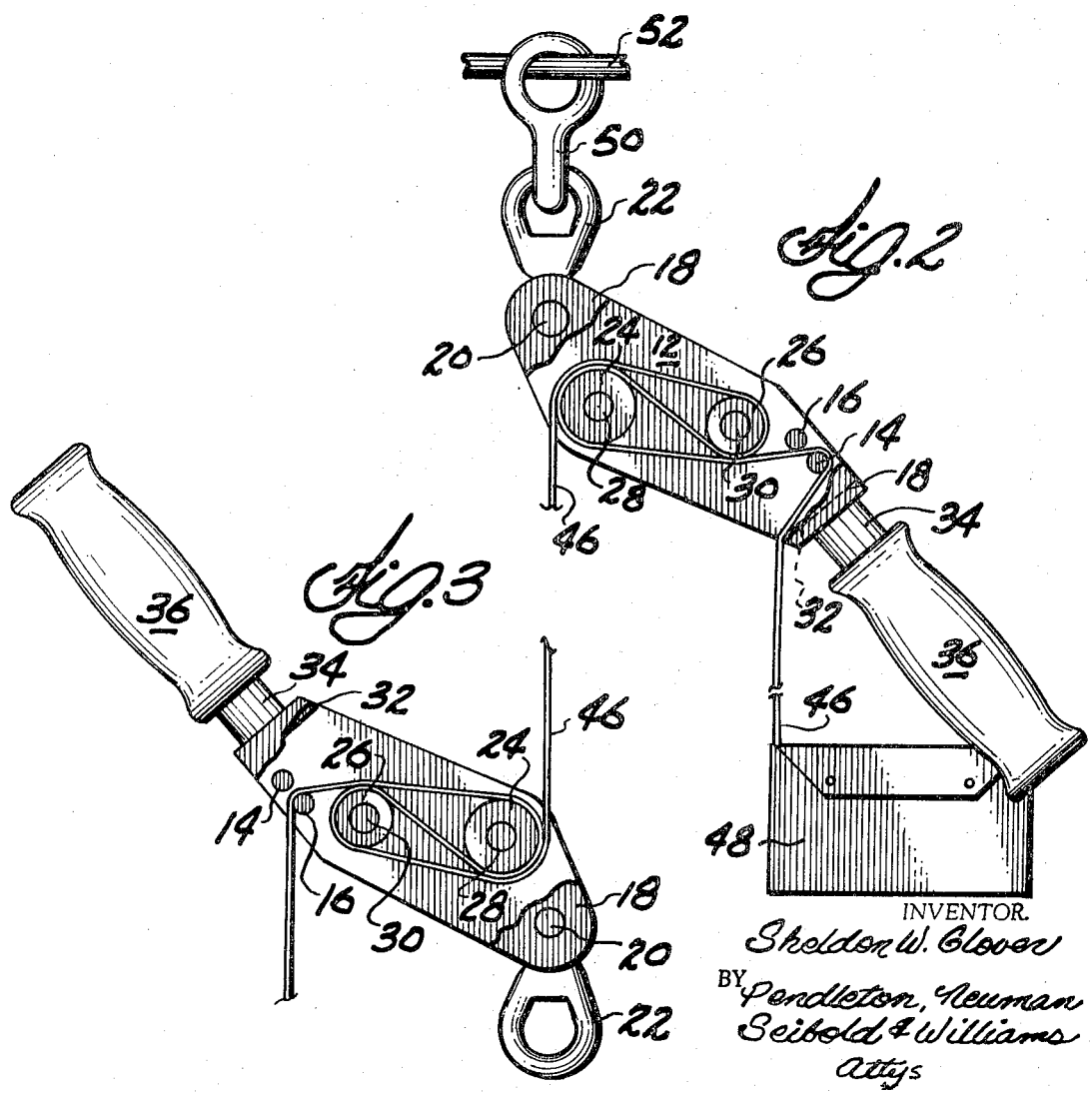
INVENTOR.
Sheldon W. Glover
BY Pendleton, Neuman
Seibold & Williams
Attys Sept. 12, 1967     S. W. GLOVER     3,340,964
DESCENT CONTROL MECHANISM
Filed Nov. 3, 1965     2 Sheets-Sheet 2
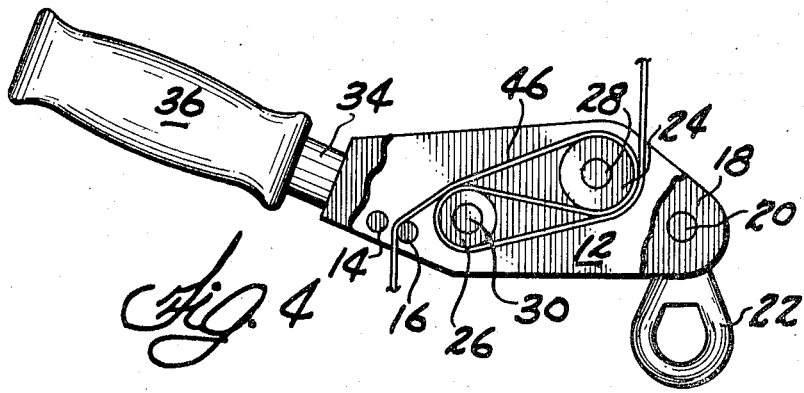
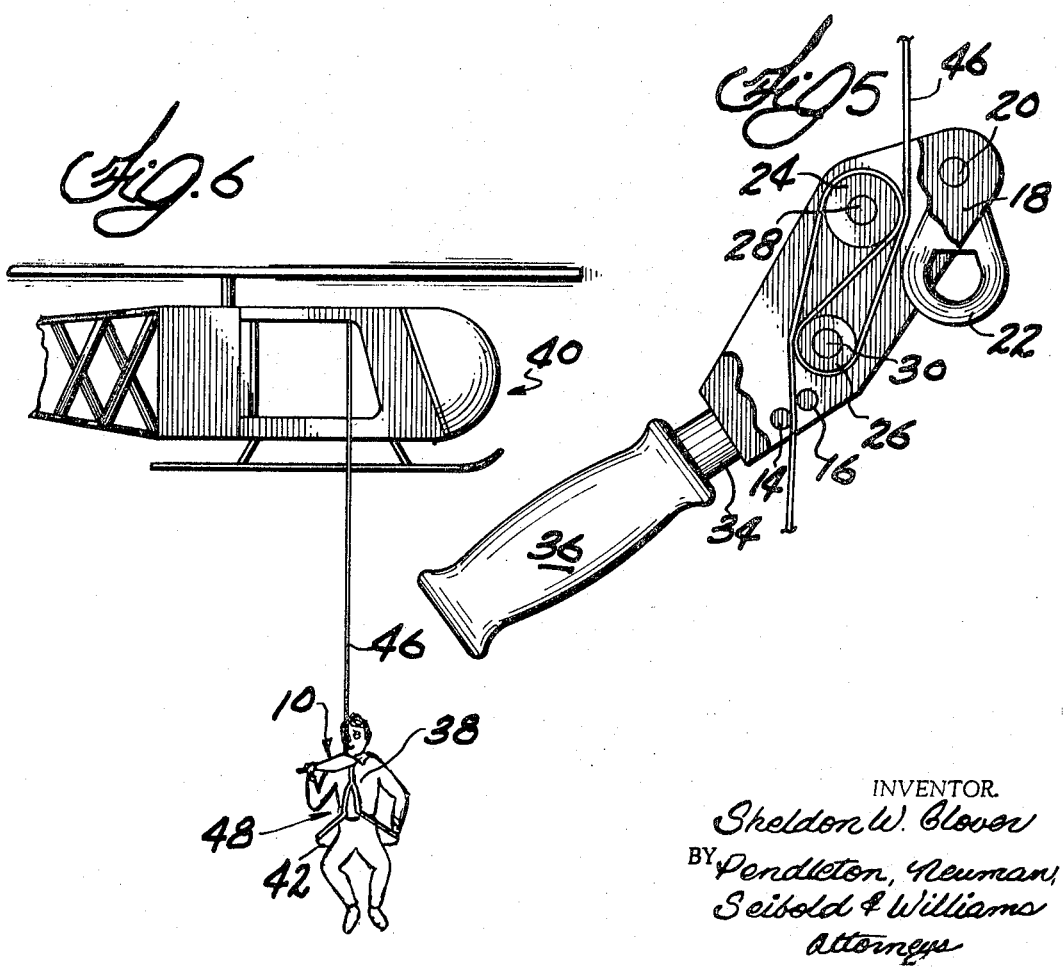
INVENTOR.
Sheldon W. Glover
BY Pendleton, Neuman,
Seibold & Williams
Attorneys

United States Patent Office 3,340,964
Patented Sept. 12, 1967

3,340,964
DESCENT CONTROL MECHANISM
Sheldon W. Glover, Whittier, Calif., assignor to Pacific-Western Materials, Inc., Pico Rivera, Calif., a corporation of Delaware
Filed Nov. 3, 1965, Ser. No. 506,242
8 Claims. (Cl. 188—65.4)

This invention pertains to a brake construction and more particularly relates to a descent control mechanism particularly adapted for, but not limited to, use with hovering aircraft.

Helicopters have found increasing use in jungle-type warfare and in rescue and general work operations in all kinds of terrain in the course of which individuals and supplies are lowered to the ground by means of a strong, elongate supporting member such as a nylon web or strap. It is, of course, essential that individuals being lowered by the hovering aircraft contact the underlying ground, or body of water, in such manner as not to cause injury. Proper and desired descent of an individual being lowered may be assured by allowing such individual to control the processes of descent to the supporting surface. In the absence of such control, the suspended individual may be subjected to such rapid descents as to jar and perhaps injure. It is apparent that as an aircraft lowers a suspended body the ability to gauge the distance to the ground is dependent upon the height of the aircraft. Therefore, the higher the aircraft the more difficulty it is to effect a gentle and non-jarring landing. Such difficulty may be abetted by the presence of strong winds which not only sway the suspended body but, in addition, may impart substantial vertical displacements to the helicopter.

In accordance with this invention the dangers of lowering a suspended person are minimized by providing a manually operable brake mechanism which enables such person to himself control the entire course of his descent to the ground.

It is an object of this invention, therefore, to provide a novel hand-operable brake construction adapted to control the unwinding or "play out" of a flexible supporting member, such as a nylon web, to which a supported person is connected, such brake being operable by the supported person in the course of descent.

It is another object of this invention to provide a novel brake construction which automatically assumes a lock or braking position in the event the manipulator releases the same, thereby obviating the possibility of an injurious fall.

It is a further object of this invention to provide a brake construction which may be readily adapted for use as a brake mechanism for a load which is being lowered from a raised position by a manipulator disposed in said raised position.

It is another object of this invention to provide a manually operable brake construction which may readily regulate the speed of descent of the load as the result of adjusting the angular disposition of the brake mechanism relative to the longitudinal axis of the strap supporting the same.

The above and other objects of this invention will become more apparent from the following description when read in the light of the accompanying drawings and appended claims.

In one embodiment of this invention a descent control, or brake construction, is provided which is adapted to be employed for regulating the descent of a load attached to the control as the control slidably moves relative to a depending flexible support such as a nylon web. The brake construction comprises a housing traversed by the web which has one end limit anchored to an overlying support such as a hovering aircraft.

The housing supportingly engages a load and comprises spaced plates maintained in desired parallel relation by transverse members including guide pins for the web. The pins are so disposed within the housing that when the web is threaded in a desired manner between the pins and over and about two friction rolls mounted between the plates, a portion of the web will be reversed and bent upon itself with web portions adapted to slidably move in opposite directions in surface-to-surface engagement. As a result, slidable movement of the web through the housing and descent of the attached load may be regulated by regulating the angular disposition of the housing relative to the vertical plane or longitudinal axis of the supporting web. This angular disposition will determine the friction and braking action effected by the web portions moving in opposite directions.

When allowed to hang freely, the housing and attached load force maximum surface areas of the supporting web which move in opposite directions to engage, thereby functioning as a brake preventing slidable movement or the housing and load relative to the web.

As the housing is pivoted relative to the web, decreasing amounts of braking web surface areas are in mutual engagement, until the point is reached at which the housing and load may move downwardly relative to the supporting web. By adjusting the angular disposition of the housing relative to the vertical, the slidable movement as well as the speed of movement of the housing and load relative to the web may be carefully controlled.

For a more complete understanding of this invention, reference will now be made to the drawings wherein:

FIGURE 1 is a fragmentary perspective view of one embodiment of a descent control made pursuant to this invention illustrated in combination with a support frame fragmentarily illustrated;

FIG. 2 is a front elevational view, partly broken away, of a control made in accordance with this invention employed in lowering a load from an overlying support;

FIG. 3 is a front elevational view of a supporting web, fragmentarily illustrated, in combination with the friction rolls and pin portions of the control of FIG. 1, partly broken away, and depicting a position in which maximum braking is effected by means of the illustrated control;

FIG. 4 is an elevational view similar to FIG. 3 illustrating the control elements of FIG. 3, pivotally moved so as to allow only partial braking by the illustrated control elements;

FIG. 5 is a view similar to FIGS. 3 and 4 illustrating the control elements of these figures in a position in which less braking effect is carried out by the illustrated control elements, enabling the load supported thereby to descend at an even quicker rate than in the control position illustrated in FIG. 4; and FIG. 6 is a fragmentary elevational view illustrating the control of FIG. 1 being used in lowering an individual from a helicopter.

In FIGS. 1 through 5 of the drawings, one side plate is removed or broken away in the illustrated controls to facilitate an understanding of the operation thereof.

Referring now more particularly to FIG. 1, descent control 10 is illustrated comprising a side plate 12 of rather irregular peripheral configuration which is of no significance per se, to which are affixed guide pins 14 and 16. Side plate 18, fragmentarily illustrated in FIGS. 2 through 5, is a duplicate of side plate 12.

Also, fixedly secured to side plate 12 is a load pin 20 adapted to supportingly engage swivel 22. Rotatably mounted in side plate 12 are friction rolls 24 and 26; rolls 24 and 26 may be immovably mounted relative to the side plates in an alternative construction.

In the normal course of assembly, side plate 18, which is appropriately apertured for reception of the journal portions 28 and 30 of the friction rolls 24 and 26, respectively, is maintained in parallel spaced relationship with opposed plate 12 by means of guide pins 16 and 14, with the assistance of load pin 20. Additional spacer pins, not illustrated, which do not interfere with movement of a web through the control may be employed between the plates if desired. Anchor block 32, having rounded edges, may also function as a spacer between plates 12 and 18 by being welded or otherwise suitably secured to the parallel plates. Handle arm 34 extends outwardly from block 32 and has a grip 36 mounted thereon which is adapted to facilitate manual pivotal movement of the entire control 10. As is evident from the drawings, the descent control 10 comprises a compact unit in which none of the interior pins or rolls project from the interior of the housing.

It is the function of the control 10 to regulate the descent of an individual, supported from the load pin 20 and swivel 22 by a support means, such as support frame 38 shown in FIG. 6. The supported individual may descend from an overlying support such as a hovering helicopter 40, also illustrated in FIG. 6. An individual, while supported by frame 38 and disposed in seat portion 42 thereof, illustrated in FIG. 6, may readily engage grip 36 comprising a portion of the control 10, and thereby adjust the angular disposition of the control 10 relative to the vertical plane.

A main support web 46 is threaded between the guide pins 14 and 16, as illustrated in FIG. 1, over friction roll 24, around the bottom of smaller friction roll and web guide 26, whereafter the main support web 46 continues upwardly, engaging the portion of the web 46 peripherally disposed about the outer surface portion of friction roll 24.

It is seen from FIG. 1 that pins 14 and 16 located at the web entrance into control 10 comb out any "foldovers" or twists that might occur in the nylon web due to improper web stowage while packing the container from which the web is played out. Such a container 48 is illustrated in FIGS. 2 and 6 and comprises a storage bag in which a web supply is contained. The bag may be strapped or otherwise secured to the individual being lowered or to the frame in which such individual is supported. It will also be apparent from FIG. 1 that the portion of the main support web 46 engaging the outer surface of friction roll 24 and the portion of the web 46 overlying said latter web portion, are moving in opposite directions, as indicated by the arrows, when the main support web 46 engages the rotating friction rolls 24 and 26.

It will be seen from FIG. 6 that the outer portion of the main support web 46 vertically extending from its contact with the inner web portion engaging friction roll 24, terminates at an overlying anchor secured to a support such as the helicopter 40. In order to allow descent of the individual supported by the frame 38, a main web supply such as is contained in container 48, illustrated in FIG. 2, must be available for play-out as the individual descends to the underlying ground.

The container 48 must obviously contain an adequate length of web so that the suspended individual may reach the underlying ground. Assuming that the lowered individual illustrated in FIG. 6 does not manually engage the grip 36 of the control 10, his weight suspended from the support pin 20 of the control will automatically move the control 10 into the position illustrated in FIG. 3 whereby support pin 20, as well as the underlying load, is in vertical alignment with the overlying anchor.

In this position, it will be noted from FIG. 3 that there is a considerable area of mutual contact between the plies of the double layer of the main support web 46 disposed about the outer periphery of friction roll 24. The large surface area of contact between the web portions moving in opposite directions about the friction roll 24 functions to effectively brake the descent of the individual suspended in seat 42 from the pin 20 and swivel 22.

Assuming that the individual wishes to descend lower from his suspended position, he will grasp the handle grip 36 of the control 10 in the manner illustrated in FIG. 6. The entire control will then be pivoted downwardly about the friction roll 24, as in FIG. 4, whereby the length of double thickness of the main support web 46 moving in opposite direction about the friction roll 24 is reduced to such an extent that the web friction is no longer capable of preventing descent of the suspended individual. A point is reached at which the suspended individual's weight, plus the minor weight of the web and frame 38, is capable of overcoming the friction effected by the contacting web portions moving in such opposite directions.

If a more rapid rate of descent is desired by the individual suspended in the seat 42, he may reduce even further the extent of contact between the web portions moving in opposite directions about the friction roll 24 by downwardly pivoting the control 10 still further to the position illustrated in FIG. 5, wherein it is apparent that only a relatively small tangential contact is present between the two web portions disposed about roll 24 moving in such opposite directions.

It is apparent, therefore, from FIGS. 3 through 5 that the provided descent control 10 may be manipulated by an individual suspended from load pins 20 to provide a desired rate of descent from an overlying helicopter by regulating the angular disposition of the control 10, as for example, by means of the handle grip 36. The angular disposition control feature is, of course, of great importance inasmuch as individuals of varying weight may use the same control and effect desired rates of descent. This may be accomplished by rapidly placing the control in desired angular positions whereby the contacting areas of web moving in opposite directions about the friction roll 24 may be adjusted at will.

The above description of the provided control 10 related to descent control in which control is effected by an individual suspended from the load pin from which position he may readily engage the handle portion of the control. It may be desirable, at times, to mount the control on the overlying supporting member, such as in illustrated helicopter 40 in FIG. 2, from which a suspended load may be lowered and from which the descent of such load may be controlled.

Thus, when it is desirable to lower objects such as supplies, the control 10 may be positioned as illustrated in FIG. 2. The control 10 in FIG. 2 is of the same construction as that of the remaining drawing figures, but is employed in a different manner. Thus, the load pin 20 and swivel 22 are supported by means of a hook 50 from a support rod 52. The pin 20 now functions as a pivot point about which the remainder of the control moves to desired angular positions. It is apparent from FIG. 2 that as the control 10 is pivoted downwardly about pin 20, increasingly greater portions of the main support web 46 come into mutual engagement about the periphery of friction roll 24, effecting greater and greater braking action on the web and the resulting descent of the lowered object.

If it is desired to lower the object suspended from web 46 at increasing rates the speed, the control 10 is pivoted upwardly about pin 20. During this movement, progressively smaller surface areas of web moving in opposite directions about friction roll 24 results, and the web 46 and the attached load may descend at increasing rates of speed. The desirability of rounding the distal edges of handle support block 32 is apparent from FIG. 2 as such rounding facilities web slidable movement relative to the block while effecting a minimum of a brading action with the web.

The above-described descent control has obvious military uses such as in jungle warfare in which troops are landed in strategic locations inaccessible by ground approach. In view of the rough terrain it is often extremely desirable that the suspended individual himself control the rate of descent so that the descent may be carried out with an optimum degree of safety.

It is believed that the foregoing description has made apparent the main features of the provided brake construction. The angle of contact of the main support web 46 with the friction roll 24 comprises one of the main features of the brake construction, since it is necessary that adjustable lengths of web moving in opposite directions come into mutual engagement in order to effect the braking action. It is also desirable that these engaging lengths of web be readily adjustable so that web slippage and resulting descent may be readily controlled. The above-described control possesses a built-in safety feature in the event a suspended individual intentionally or inadvertently releases the handle portion of the descent control. As above explained, release of the control automatically places the unit 10 in position of maximum braking illustrated in FIG. 3.

It is seen from the drawings that the positions of guide pins 14 and 16, as well as friction roll 26, relative to friction roll 24 insure a desired angular approach of the web 46 to roll 24, and that the position of the friction roll 26 relative to friction roll 24 insures a desired angular departure of web 46 from the periphery of friction roll 28 during control descent. The guide pins which insure the entrance of the web 46 in a desired flat condition into the control 10 also serve to direct the web into a substantially tangential contact with friction roll 26 prior to engagement by the web with roll 24. This tangential contact is substantially constant for all angular positions of the control 10. The web angular relationships relative to the roll 24 assure the continuous engagement of a major portion of the periphery of the roll 24 with web 46 in the normal course of control use. More importantly, the pins 14 and 16 and the roll 26 assure continuous contact of a portion of web 46 with a surface portion of friction roll 24 which is always in excess of the web overlying layer formed about roll 24 moving oppositely to the underlying layer during normal control movement. It is further apparent from the drawings and the above description that the friction roll 24, about which the control device and suspended load pivot, is disposed intermediate the guide pins 14, 16 and the load pin 20 when said control is viewed along an axis disposed parallel to the central axis of handle arm 34. In this same attitude the friction roll 26 is disposed between roll 24 and guide pins 14, 16.

The distance between the load pin 20 and the axis of the vertical portion of web 46, together with the weight suspended from the pin 20 create a turning moment tending to bring the pin 20 in line with the overlying anchor, i.e., into the position of FIG. 3. It is apparent, therefore, that the greater distance, or lever arm, of the turning force applied to handle grip 36 of the control 10 from the pivot point or friction roll 24 which is applied to oppose the turning moment created by the load suspended from pin 20, the less is the necessary applied force.

Since the foregoing description is believed adequate to enable anyone skilled in the art to manufacture a control according to the invention, the following specific dimensions are given by way of example only. A suitable device may be fabricated in which the spaced side plates 12 and 18 are of metal ⅛ inch thick and spaced apart one inch. The maximum length of the plates as measured along an axis parallel to handle arm 34 is approximately 5½ inches. The handle arm which may comprise ¾ inch aluminum tubing and which has grip 36 mounted thereon extends approximately 4½ inches from the plate ends. The maximum plate width as measured along an axis disposed at right angles to the above "parallel axis" and passing through the center of roll 24 is approximately three inches. The centers of friction rolls 24 and 26 are spaced about 1 9/16 inches along an axis disposed parallel to the handle arm. The interval between the center of roll 24 and the center of load pin 20 is 1½ inches as measured along an axis parallel to handle arm 34.

The interval between the centers of rolls 24 and 26 is 1⅜ inches, between the centers of roll 24 and load pin 22, 5/16 inch, and between the centers of roll 26 and guide pin 16, ½ inch, all of said latter measurements being taken along axes disposed at right angle to handle arm 34. The diameter of roll 24 is one inch and the diameter of roll 26 is approximately ¾ inch. Load pin 20 is approximately ½ inch in diameter. The guide pins are about ¼ inch in diameter and the centers thereof spaced apart slightly less than ½ inch.

It is apparent that various modifications may be made in the construction illustrated and described. Friction rolls 24 and 26 need not be rotatable and may be fixedly mounted and have smooth exterior peripheries to facilitate slidable movement of the main support tape member thereover. Utilizing the illustrated embodiments of the drawings, a force in the amount of approximately ten percent of the weight of the individual being lowered is necessary to pivot the control into the necessary angular relationship to initiate downward movement. Accordingly, the necessary angular disposition of the control may be readily effected by any normal individual.

The web 46 may be coated or impregnated with a plastic material which will reduce abrasion in the web materials while providing a greater coefficient of friction between the contacting web layers moving in opposite directions.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. In a brake construction for braking the descent of a load supported by a depending flexible web, the combination comprising a turntable brake housing, friction roll and fulcrum means about which said housing is turnable, a first side of said friction roll and fulcrum means defining an unconfined area of entry into the brake housing for receiving a suspension vertically-disposed flexible web, load-engaging means anchored to said housing from which a load may depend, said load-engaging means being disposed laterally of said first side of said friction roll and fulcrum means and laterally of a vertical line defined by such vertically-disposed flexible web; guide means disposed laterally to the opposite side of said friction roll and fulcrum means and laterally of such vertical line; said guide means being adapted to guide, at least, a layer of said vertically-disposed flexible web about peripheral portions of said friction roll and fulcrum means; and means for turning said brake housing about said friction roll and fulcrum means for varying the relationship between said guide means and said friction roll and fulcrum means to increase the overlying extent of said vertically-disposed flexible web portion about said friction roll and fulcrum means in one direction of turning and to decrease such overlying extent of said web portion in the counter-direction of turning.

2. The brake construction of claim 1 in which the guide means are adapted also to guide layers of the vertically-disposed flexible web, movable in opposite directions when movable relative to the brake housing, about peripheral portions of the friction roll and fulcrum means, and the means for turning the brake housing about said friction roll and fulcrum means also increase the extent of the countermoving vertically-disposed flexible web portions in overlying relation about said friction roll and fulcrum means in one direction of turning and decrease such extent of said web portions in overlying relation in the counter-direction of turning.

3. The brake construction of claim 1 in which a support frame is suspended from said load-engaging means which is adapted to support an individual who is located adjacent to said housing whereby he may readily turn the brake housing by hand while supported in said support frame.

4. The brake construction of claim 1 in which a source of web material is suspended from said load-engaging means and means for removing wrinkles in said web material fed from said source prior to engagement with said roll means define a web material entrance into said housing.

5. The brake construction of claim 4 in which said roll means is rotatably mounted between spaced parallel plates defining opposed sides of said housing, the interval between said plates being substantially equal to the width of said web material.

6. The brake construction of claim 4 in which said guide means comprises a guide roll and said web material extends about a major peripheral portion of said roll means after an initial portion thereof passes over said guide roll; said web material returning from said roll means to extend about a major peripheral portion of said guide roll after passing beneath said initial web portion.

7. The brake construction of claim 1 in which a handle means extends from said housing for manual engagement whereby the housing may be readily turned and the amount of web material in overlying arrangement about said roll means may be adjusted.

8. The brake construction of claim 1 in which said roll means and said guide means are cylinders fixedly mounted between spaced parallel plate means defining the opposed sides of said housing.

References Cited
UNITED STATES PATENTS

| | | |
|---|---|---|
| 209,137 | 10/1878 | Rotschka et al. _ _ _ _ 188—65.4 X |
| 273,807 | 3/1883 | Braunfeld _ _ _ _ _ _ _ _ 188—65.4 X |
| 311,039 | 1/1885 | Scheidt et al. _ _ _ _ _ 188—65.4 X |
| 2,578,753 | 12/1951 | Smith _ _ _ _ _ _ _ _ _ _ _ _ _ 188—65.4 |
| 3,022,856 | 2/1962 | Galeano _ _ _ _ _ _ _ _ _ 188—65.4 X |

MILTON BUCHLER, *Primary Examiner.*

B. S. MOWRY, T. W. BUCKMAN, *Assistant Examiners.*

UNITED STATES PATENT OFFICE
CERTIFICATE OF CORRECTION

Patent No. 3,340,964                          September 12, 1967

Sheldon W. Glover

It is hereby certified that error appears in the above numbered patent requiring correction and that the said Letters Patent should read as corrected below.

Column 1, line 23, for "processes" read -- process --; column 2, line 20, for "or" read -- of --; column 4, line 9, for "direction" read -- directions --; line 27, for "pins" read -- pin --; line 69, for "facilities" read -- facilitates --; column 5, line 54, before "distance" insert -- the --; line 73, after "spaced" insert -- apart --; column 6, line 41, for "turntable" read -- turnable --.

Signed and sealed this 22nd day of October 1968.

(SEAL)
Attest:

Edward M. Fletcher, Jr.
Attesting Officer

EDWARD J. BRENNER
Commissioner of Patents